W. P. SPOONER.
DETACHABLE TIRE TREAD.
APPLICATION FILED MAY 17, 1917.
1,258,490.
Patented Mar. 5, 1918.
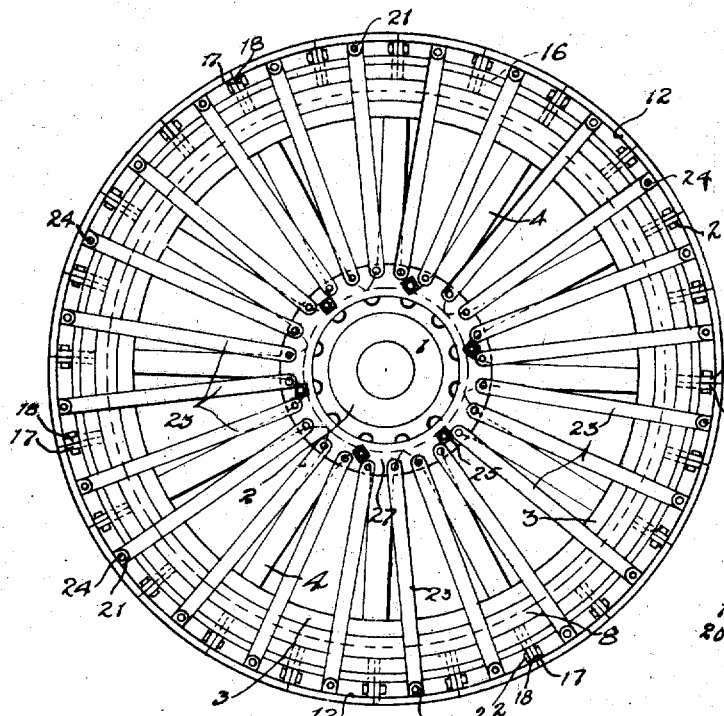
Fig. 1
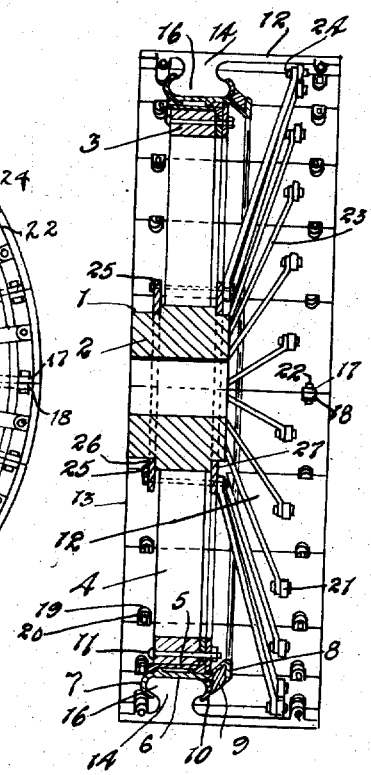
Fig. 2
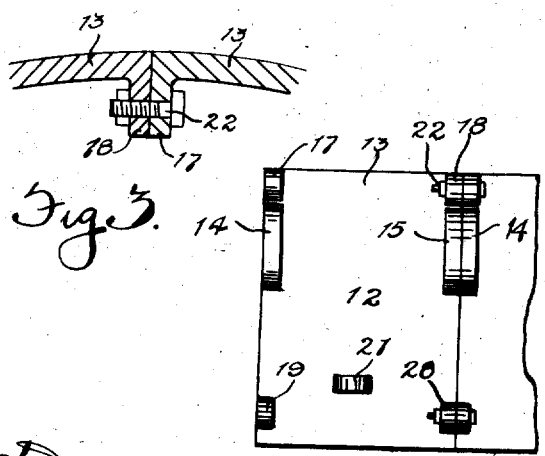
Fig. 3
Fig. 4
Witnesses
Roland Foster
V. Kneeshaw.
Inventor
W. P. Spooner

UNITED STATES PATENT OFFICE.

WILLIAM PERCY SPOONER, OF RATHWELL, MANITOBA, CANADA.

DETACHABLE TIRE-TREAD.

1,258,490.

Specification of Letters Patent.

Patented Mar. 5, 1918.

Application filed May 17, 1917. Serial No. 169,273.

*To all whom it may concern:*

Be it known that I, WILLIAM PERCY SPOONER, of the town of Rathwell, in the Province of Manitoba, Canada, have invented certain new and useful Improvements in Detachable Tire-Treads, of which the following is the specification.

The invention relates to improvements in detachable tire treads, particularly constructed for application on automobile wheels and the principal object of the invention is to provide a tread which can be readily attached to the automobile wheel once the tire is removed, the tread giving a wide bearing surface much in the nature of a traction wheel thereby allowing the use of the automobile in all seasons and conditions of roads.

A further object of the invention is to construct the tread in a sectional manner so that it can be readily assembled and so that it can be readily adjusted to accommodate the varying diameters of existing wheels.

With the above objects in view the invention consists essentially in a tread formed from a plurality of similar sections circumscribing the wheel and detachably bolted together and provided on the inner side with peculiarly shaped extending fastening lugs, a pair of clamping plates and brace bars extending between one of the plates and the assembled tread sections, the parts being arranged and constructed as hereinafter more particularly described and later pointed out in the appended claim, reference being had to the accompanying drawing in which:—

Figure 1 represents a side view of my complete tread as applied on an automobile wheel.

Fig. 2 represents a vertical sectional view through the wheel and applied tread.

Fig. 3 represents an enlarged detailed vertical sectional view through the fastened ends of two of the tread sections.

Fig. 4 represents an inverted plan view of the joint formed between two tread sections.

In the drawing like characters of reference indicate corresponding parts in the several figures.

1 represents an ordinary automobile wheel presenting a hub 2, felly 3 and radiating spokes 4 connecting the hub with the felly.

The wheel is customarily provided with a means for detachably fastening the ordinary tire to the felly and this is usually composed of a band 5 around the felly, a rim 6 mounted on the band and provided at one side with an outstanding tire grip 7 and at the other side with a ring holder 8, a split ring 9, a second ring like tire grip 10 mounted on the rim and bolts 11 fastening the rim to the felly.

The parts as above disclosed allow of the quick mounting of the ordinary tire on the wheel, the inner edges of the tire being caught between the tire grips 7 and 10 when the tire is finally fastened.

The particular details of this releasable fastening for the tire are of no consequence in this specification as in the application of my invention it is only necessary that the peculiar lugs which I provide on the tread sections be caught between the tire grips 7 and 10 or similarly constructed grips serving the same function.

My tread is now described in detail. It comprises a plurality of tread sections, all identically constructed so that it is only necessary herein to describe one of them in detail.

Each section 12 embodies a plate 13 fitted on the inner side with opposing fastening lugs 14 and 15 which are provided with enlarged heads 16 which are adapted in the applied position of the section to rest on the rim and be received between the tire grips 7 and 10. Further the inner side of each section is provided with pairs of eyes 17, 18, 19 and 20 at the sides and with a more or less centrally disposed eye 21.

The completed sections will all be slightly curved so that when assembled around the rim they will present a smooth running surface.

After the sections have been mounted on the rim between the grips they are fastened together by bolting as indicated at 22 through the eyes 17, 18, 19 and 20.

Here I wish it to be noticed that the tread overhangs considerably more to the outer side of the wheel than to the inside. The overhanging or extending part of the tread is reinforced by stay bars 23, which have their outer ends bolted as indicated at 24 to the eyes 21 and their inner ends fastened such as by bolts 25 to a pair of fastening plates 26 and 27 mounted on the hub and located at opposite sides of the spokes.

As will be observed the latter bolts pass between the spokes and serve the double function of holding the plates in position as well as fastening the inner ends of the stay bars.

The above completes the description of the parts and from the disclosure it will be seen that the whole tread can be very readily secured to the wheel and it is easily removed and further that the applied tread gives a wide bearing surface for the wheel thereby allowing the automobile to be used under all road conditions.

While I have described the invention as applied to an automobile wheel, still it will be readily understood that it could be readily adapted for attaching to various vehicle wheels, it being simply a matter of modifying the fastening lugs to accommodate the rim of the wheel on which the appliance is used.

This invention could readily be modified so that instead of having a considerable number of sections there could be two sections, each of which would extend half way around the wheel and in which case it would only be necessary to have the fastening eyes 17, 18, 19 and 20 appearing at the meeting ends of the two sections although the eyes 21 would still be retained as well as the fastening lugs.

In utilizing the two sections it would be necessary to divide or split in two each of the fastening plates so that when the appliance was unbolted it would come apart in two sections as the split in the fastening plates would be diametrically alined with the joint between the sections. This latter modification would allow of the quick mounting of my invention on the wheel as it would be only necessary to apply the two halves in position on the wheel and then bolt them together.

What I claim as my invention is:—

The combination with the rim of a wheel and opposing tire grips carried by the rim, of a tread formed from a plurality of similar detachably connected sections surrounding the tread and provided on the inner side with projecting fastening lugs received between the tire grips, opposing fastening plates mounted on the hub and bolted together through the spokes of the wheel and brace bars detachably secured to one of the plates and to the inner side of the tread.

Signed at Rathwell, this 2nd day of April, 1917.

WILLIAM PERCY SPOONER.

In the presence of—
Jno. A. Cameron,
Robt. J. Pringle.